United States Patent [19]
Mullen et al.

[11] Patent Number: 5,345,386
[45] Date of Patent: Sep. 6, 1994

[54] AIRCRAFT ENGINE MANAGEMENT SYSTEM

[75] Inventors: Stuart I. Mullen; Leslie R. Summerfield, both of Bristol, England

[73] Assignee: Rolls Royce Plc., Bristol, England

[21] Appl. No.: 986,743

[22] Filed: Dec. 8, 1992

[30] Foreign Application Priority Data

Dec. 17, 1991 [GB] United Kingdom ............... 9126778

[51] Int. Cl.⁵ .................. G06F 15/48; G06G 7/70
[52] U.S. Cl. .................. 364/431.02; 364/442; 364/431.01; 60/39.281; 60/39.27; 60/243
[58] Field of Search ......... 364/431.01, 431.02, 364/431.03, 431.04, 431.05, 431.06, 431.07, 431.08, 431.09, 431.10, 431.11, 431.12, 494, 442; 60/39.281, 243, 39.27, 39.8, 235, 240, 39.161, 39.141

[56] References Cited

U.S. PATENT DOCUMENTS

| | | | |
|---|---|---|---|
| 4,429,528 | 2/1984 | Matthews et al. | 60/39.281 |
| 4,459,671 | 7/1984 | Teass et al. | 364/442 |
| 4,697,238 | 9/1987 | Barbeau | 364/431.02 |
| 5,023,797 | 6/1991 | Lappos et al. | 364/442 |
| 5,076,048 | 12/1991 | Boston | 60/39.281 |
| 5,083,277 | 1/1992 | Shutler | 364/431.02 |

Primary Examiner—Thomas G. Black
Assistant Examiner—Jacques Harold Louis-Jacques
Attorney, Agent, or Firm—Oliff & Berridge

[57] ABSTRACT

An aircraft jet engine management system has a digital electronic control unit (DECU) which measures turbine blade temperature (TBT) and controls the engine in such a way as not normally to exceed a TBT normal datum, there being an over-ride facility which responds to special circumstances as represented by one or more pilot-independent inputs to the DECU to allow temporary over-ride of the TBT limitation program, at least cut-off of the over-ride being pilot-independent.

9 Claims, 2 Drawing Sheets

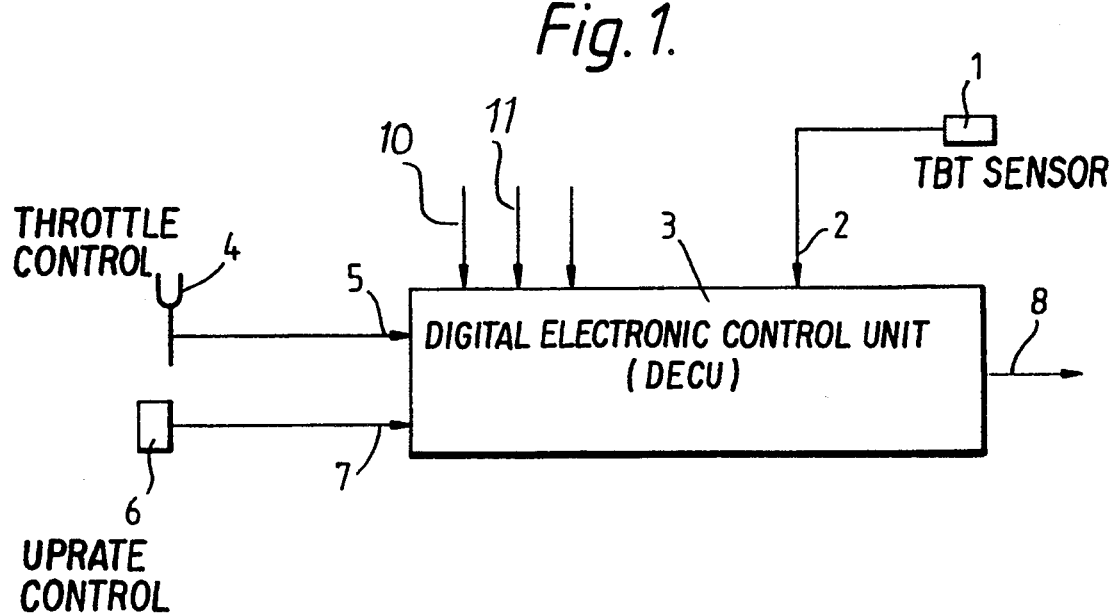
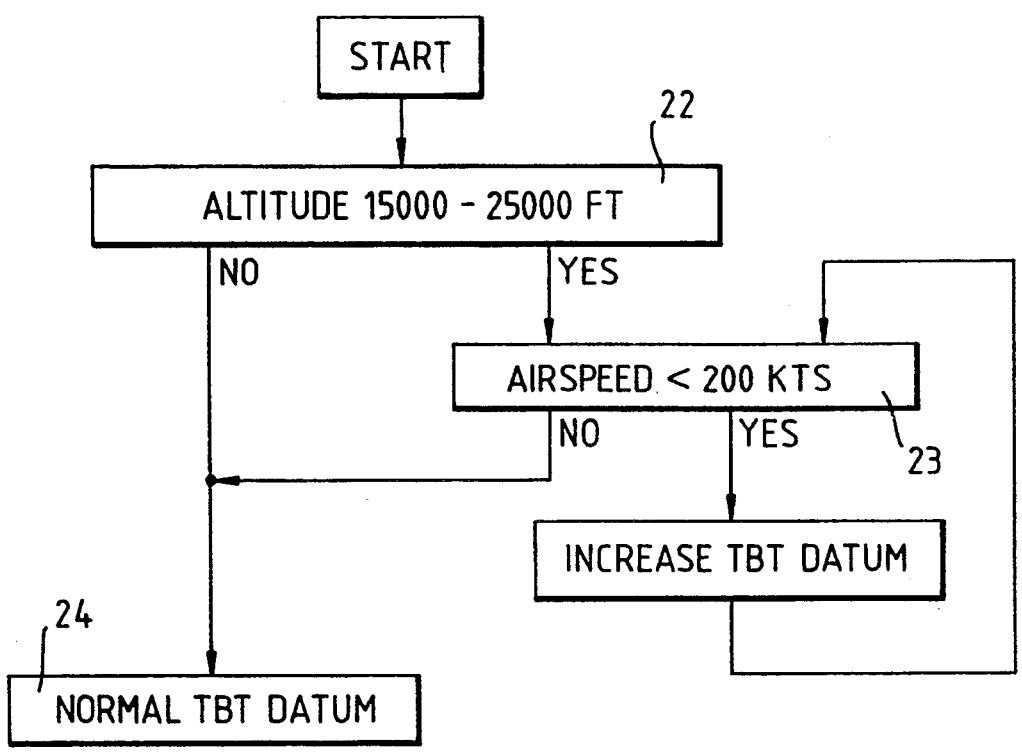

AIRCRAFT ENGINE MANAGEMENT SYSTEM

FIELD OF THE INVENTION

The invention relates to an aircraft engine management system and has particular application in the management of jet engines.

BACKGROUND OF THE INVENTION

Engine life may be shortened if any of several critical parameters are exceeded during operation. For this reason maximum datum levels are set and the relevant parameters are monitored and fed back to an engine management system which maintains engine operation within the limits set by the datum levels. Turbine temperature is one such critical parameter. In one example it is measured by monitoring turbine gas stream temperature by means of thermocouples, for example. In another an optical pyrometer is used to measure the temperature of the turbine blades by infra-red emission.

In the example described below the limiting effect on jet engine life is turbine blade temperature (TBT). An engine management system continuously measures the TBT and controls the fuel burn so as to limit the TBT to a particular value according to prevailing circumstances. The datum limit value of TBT chosen is a compromise between performance and engine life. For a given required engine life there is a particular value of TBT for particular circumstances and thus a corresponding maximum available thrust. Temporary increased thrust is available by allowing an increase in TBT but the cost is extremely severe in terms of reduction of engine life, the reduction being dependent upon the extent of the TBT increase and the time it prevails.

The engine management system generally includes a digital electronic control unit (DECU) which receives input from a pilot control input which represents a demand for power; a TBT sensor and ambient pressure and temperature sensors. The DECU is programmed to control the fuel feed to the engine in order to meet the pilot power demand subject to the datum limit of TBT for the prevailing circumstances not being exceeded.

Some engines are fitted with a reheat system by operation of which engine thrust may be increased, usually, for short periods of time. The TBT limit may be raised for reheat operation, any such change is implemented by reheat selection independently of any other manual input. Provision may be made for the pilot to manually override the limiter in certain circumstances.

There are special circumstances other than emergencies where operating advantages could be achieved by over-riding the normal control characteristics of the DECU temporarily. The present invention provides an engine management system capable of providing enhanced performance under special circumstances without the risk of pilot abuse.

SUMMARY OF THE INVENTION

According to the invention there is provided an aircraft jet engine management system comprising a digital electronic control unit (DECU) having a pilot demand input; an input from a critical engine parameter sensor; one or more additional pilot-independent inputs; an output for controlling fuel supply to the engine; a memory and a microprocessor, the DECU being programmed with a sensed parameter limitation program to respond to the pilot demand input to control fuel supply to the engine and thus adjust power subject to the sensed parameter not exceeding a reference value which has a normal datum level, wherein there is an over-ride facility responsive to one or more of the said additional pilot-independent inputs to invoke (a) over-ride and (b) resumption of the parameter limitation program subject to special circumstances represented by the additional inputs, at least the resumption (b) of the parameter limitation program being independent of the pilot.

It is important to note that resuming the parameter limitation program is independent of the pilot. Preferably also the over-ride is invoked independently of the pilot with the proviso, however, that the pilot may have a control to select whether the over-ride facility is available or not. With this arrangement the excess parameter level and its duration are governed by the special circumstances and not by the pilot. Minimum engine life penalty is thus paid for enhanced performance under the special circumstances.

Two sets of special circumstances to which the invention is applicable will be described specifically, although it will be appreciated that there are many others. The first situation envisaged is a requirement for an aircraft to take off from an airfield which is at an unusually high altitude. Extra power may be required for a short time at take-off from this particular air field but not for take-off from others. In this situation the said additional inputs may be ambient air pressure (representative of altitude) and air-speed. Thus, take-off from a high air field can be defined as pertaining only when the ambient air pressure is sufficiently low and the air-speed is less than the stalling speed of the aircraft. If the DECU receives both these inputs simultaneously then over-ride can be invoked. This means that extra thrust is available for take-off under these special circumstances. The parameter limitation program is automatically resumed when the aircraft has reached a safe speed as represented by the air-speed input. Another situation in which the invention might be used is in a hot ambient temperature, and when the aircraft is heavier than normal.

The second specific example of special circumstances is in the maintenance of an air patrol pattern. In executing an air patrol pattern a pilot generally flies a series of straight legs, turning periodically from one leg to the next. To maintain altitude in turns power must be increased over that required for level flight. In order to allow a sufficient power margin for turns, without exceeding the desired maximum parameter, a particular cruising altitude is chosen. A higher cruising altitude would be possible, with consequent increase in mission duration, if a temporary increase in parameter level were allowed in turns. Automatic over-ride of the parameter limitation program in accordance with the invention provides a solution to this problem. Thus, the aforesaid additional inputs to the DECU could be ambient pressure (representative of altitude) and air-speed (representative of turns). Alternatively, the attitude of the aircraft could be used to indicate turns.

Thus, the DECU would recognize a turn executed at the required cruising altitude and would allow over-ride of the temperature limitation program for the duration of the turn but no longer.

BRIEF DESCRIPTION OF THE DRAWINGS

The invention will further be described with reference to the accompanying drawings, of which:

FIG. 1 is a schematic diagram of an engine management system in accordance with the invention;

FIG. 3 is a block diagram of another over-ride program.

DESCRIPTION OF THE PREFERRED EMBODIMENTS

Figure 2:
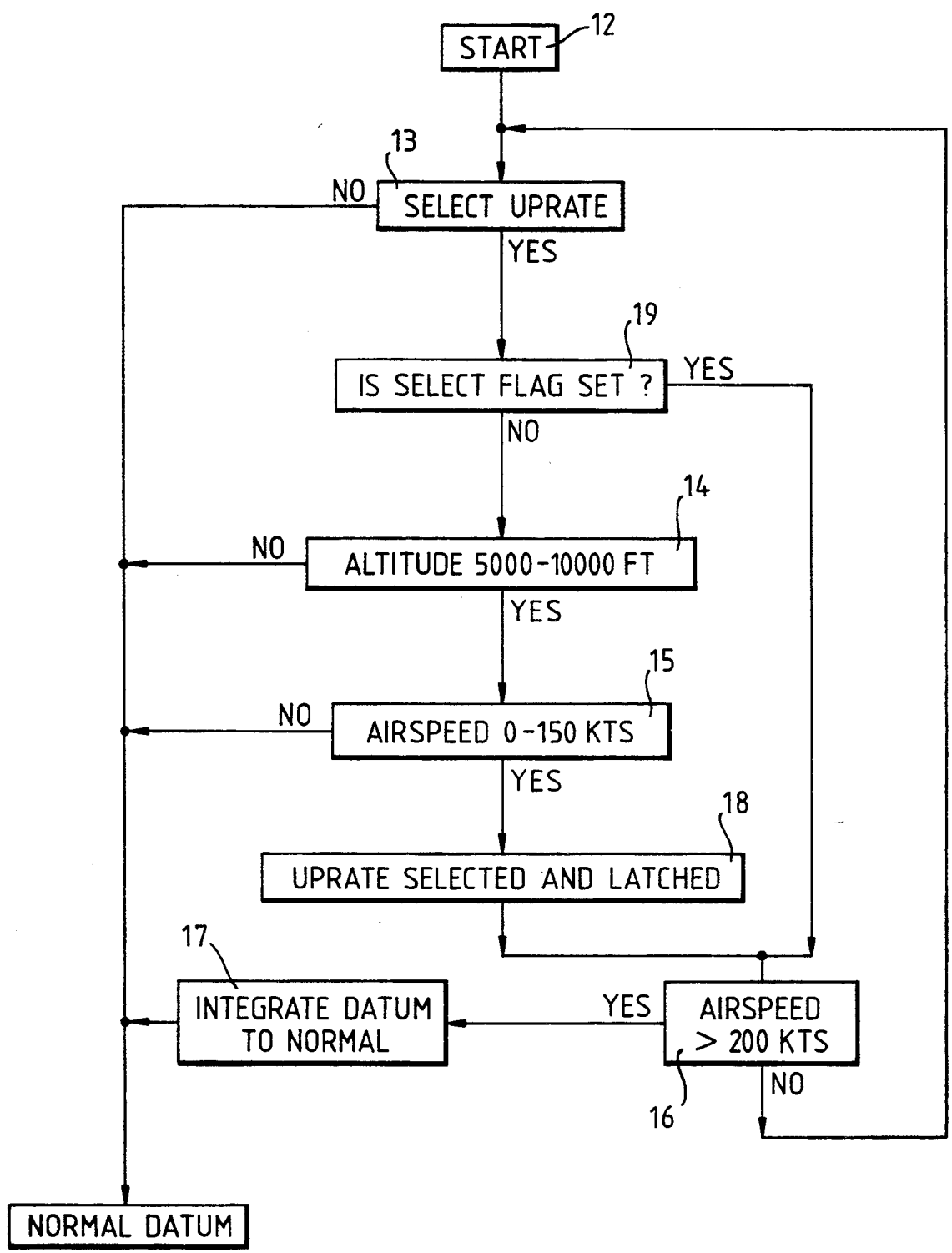
FIG. 2 is a block diagram of the over-ride program for the system of FIG. 1.

Referring to FIG. 1 there is shown in schematic form the fundamental part of the engine management system for an aircraft jet engine. An optical temperature sensor 1 detects the turbine blade temperature (TBT) of the engine and an appropriate input is applied at 2 to a digital electronic control unit (DECU) 3. The pilot has a throttle control 4 which applies a demand input at 5 to the DECU.

In the particular example, throttle control 4 has a normal range of dry thrust settings and a farther range of reheated thrust settings. The TBT limit is the same in both ranges but need not be. However, the pilot may have, as in the present example, an uprate control 6 which applies an uprate input at 7 to the DECU. The purpose of the uprate control is to permit the possibility of extra thrust by raising the TBT limit. The DECU has an output 8 which controls fuel admission to the engine and is programmed to ensure that the TBT does not exceed a particular value. Other inputs are applied to the DECU, namely an air-speed input at 10 and an ambient pressure input at 11. This particular system is designed to allow over-ride of the normal DECU temperature limitation program for increased thrust at take-off from air-fields of high altitude.

FIG. 2 illustrates the function of the over-ride program. From program start 12 a module 13 detects whether the pilot has selected uprate or not. While having no direct control over the invoking or the cut-out of the over-ride, the pilot selects, by his uprate selector 6, whether the over-ride program may be initiated or not. If the pilot has selected uprate an altitude module 14 detects whether altitude is between 5000 and 10000 ft (in this example). If YES, an air-speed module 15 detects whether speed is below 150 knots (in this example). If YES a take-off uprate datum temperature is selected by module 18 for application to the DECU temperature limitation program (not shown). This raises the temperature limit allowed at the turbine blades, and thus allows more thrust for take-off.

Module 18 selects and latches an uprated TBT limiter program, and on the first program pass sets a flag in the function program loop indicating the uprate is latched. The final decision point in the loop is module 16 which checks if airspeed has reached 200 knots. If the decision is NO the program loop returns to the start and re-enters module 13 which checks that the uprate requirement remains selected. If YES module 19 checks for the uprate select flag. On second and subsequent program loops the flag is found and the program is diverted directly to module 16 which rechecks the airspeed. This cycling continues until the aircraft reaches 200 knots.

When air-speed has reached a safe value of over 200 knots, indicating that take off has been completed, cut-out module 16 applies a YES output to a module 17 which reduces the DECU temperature datum progressively to normal level. While airspeed remains below 200 knots a NO output is given from module 16 and maintains uprate latched until 200 knots is achieved.

Clearly, modifications may be made in the implementation of the invention. For example, instead of giving a YES output in the speed range 0–150 knots the module 15 may be arranged to operate in the range 50–150 knots. This ensures that extra TBT is not allowed during static engine testing and the time of extra TBT for each take-off is reduced.

Referring now to FIG. 3, there is shown an over-ride program control for use in aircraft patrol situations. The object of this is to allow extra TBT only in turns when the aircraft is patrolling. An altitude module 22 detects whether the aircraft is at patrol level between 15000 and 25000 ft. If YES, an air-speed module 23 is invoked to determine whether air-speed is below 200 knots (representative of a turn). If YES the TBT datum in the temperature limitation program is increased to allow more thrust and thus ensure that height is maintained during the turn. "NO" outputs cause a module 24 to reduce the TBT datum progressively to normal. Thus, as with the arrangement of FIG. 2, levels are built in to the over-ride program which reflect special circumstances under which extra TBT is allowed. It is important to note that invoking the over-ride is pilot independent and more importantly, cut-out of the over-ride is pilot-independent. Thus, the pilot can not leave the over-ride on inadvertently.

The invention is not restricted to the details of the embodiments described above. The inputs for the DECU have been described as including pilot demand and combat signals, TBT, altitude and air-speed. In addition there may be, for example, inputs indicating high and low pressure compressor spool speeds; ambient temperature; time; aircraft attitude and under-carriage load.

We claim:

1. An aircraft jet engine management system comprising a digital electronic control unit (DECU) having a pilot demand input; an input from a critical engine parameter sensor; one or more additional pilot-independent inputs; an output for controlling fuel supply to the engine; a memory and a microprocessor, the DECU being programmed with a sensed parameter limitation program to respond to the pilot demand input to control fuel supply to the engine and thus adjust power subject to the sensed parameter not exceeding a reference value which has a normal datum level, wherein there is an over-ride facility responsive to one or more of the said additional pilot-independent inputs to invoke (a) over-ride and (b) resumption of the parameter limitation program subject to special circumstances represented by the additional inputs, at least the resumption (b) of the parameter limitation program being independent of the pilot.

2. An aircraft jet engine management system as claimed in claim 1 where both invocation (a) of the over-ride and resumption (b) of the sensed parameter limitation program are independent of the pilot.

3. An aircraft jet engine management system as claimed in claim 2 wherein over-ride of the sensed parameter program is effected by operating under the program but temporarily increasing the sensed parameter reference value beyond the normal datum level.

4. An aircraft jet engine management system as claimed in claim 1 wherein the sensed parameter represents turbine temperature.

5. An aircraft jet engine management system as claimed in claim 4 wherein the sensed parameter represents turbine blade temperature (TBT).

6. An aircraft jet engine management system as claimed in claim 1 which is designed to allow increased sensed parameter level on take-off from airfields above a certain height, the said additional inputs including an altitude input and an air-speed input, the over-ride being invoked only if the aircraft is operating above a predetermined height and below a first predetermined speed and the over-ride being cut out when the aircraft achieves a second predetermined speed.

7. An aircraft jet engine management system as claimed in claim 1 which is designed to allow an increased sensed paramater reference value in turns, the said additional inputs including an input representative of the aircraft turning.

8. An aircraft jet engine management system as claimed in claim 7 wherein the input representative of the aircraft turning is an air-speed input, turning being effected only below a predetermined air-speed.

9. An aircraft jet engine management system as claimed in claim 8 wherein one of said additional inputs is an altitude input, the over-ride program being controlled to be effective only in a particular altitude range.

* * * * *